(12) United States Patent
Lin et al.

(10) Patent No.: US 6,540,494 B2
(45) Date of Patent: Apr. 1, 2003

(54) LINKAGE TYPE MOLD CLAMPING DEVICE DRIVEN BY ELECTROMAGNETIC FORCE

(75) Inventors: Hsin-Hung Lin, Hsinchu Hsien (TW); Min-Wen Wang, Hsinchu (TW); Hsuan Peng, Hsinchu (TW); Li-Teh Hu, Hsinchu Hsien (TW); Yong-Zhen Chung, Hsinchu Hsien (TW); Ming-Chang Deng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 88 days.

(21) Appl. No.: 09/852,795

(22) Filed: May 11, 2001

(65) Prior Publication Data

US 2002/0134181 A1 Sep. 26, 2002

(30) Foreign Application Priority Data

Mar. 21, 2001 (TW) ...................................... 90204215 U

(51) Int. Cl.[7] .............................................. B29C 45/64
(52) U.S. Cl. ..................... 425/3; 425/451.5; 425/592; 425/DIG. 33
(58) Field of Search ............................ 425/3, DIG. 33, 425/592, 593, 451.5, 451.6; 100/917, 281

(56) References Cited

U.S. PATENT DOCUMENTS

| | | | | |
|---|---|---|---|---|
| 3,887,312 A | * | 6/1975 | Seary .............................. | 425/3 |
| 4,008,021 A | * | 2/1977 | Fedrigo et al. ................. | 425/3 |
| 5,322,430 A | * | 6/1994 | Kasai et al. .................... | 425/3 |
| 5,470,592 A | * | 11/1995 | Steger ............................. | 425/3 |
| 6,124,648 A | * | 9/2000 | Shibuya et al. ................ | 425/3 |

* cited by examiner

*Primary Examiner*—James P. Mackey
(74) *Attorney, Agent, or Firm*—Rabin & Berdo, P.C.

(57) ABSTRACT

An electromagnetic driving device for a mold clamping system is disclosed, which has a stationary plate fixedly mounted on a lathe bed; a mold guiding mechanism mounted parallel on the lathe bed; a movable plate slidably arranged on the mold guiding mechanism, facing the stationary plate, for generating a relative slide to the stationary plate; and a movable plate driving mechanism for driving the movable plate on the mold guiding mechanism. The electromagnetic driving device utilizes magnetic force to drive the linkage, movable plate etc. to perform open-mold movement, close-mold movement, and mold-locking movement.

7 Claims, 3 Drawing Sheets

LINKAGE TYPE MOLD CLAMPING DEVICE DRIVEN BY ELECTROMAGNETIC FORCE

BACKGROUND OF THE INVENTION

1. Field of the Invention

The present invention relates to a mold clamping system and, more particularly, to a linkage type mold clamping device driven by electromagnetic force.

2. Description of the Related Art

The prior art mold clamping system utilizes a hydraulic cylinder or a servomotor as a power unit, and a toggle mechanism or a linkage as a mechanism for magnification and transmission of the clamping force. However, the composition of the mold clamping system is too complicated, and the requirement of the relative dimension accuracy is too high. Further, the clamping mold force is, disproportionate, and fatigue occurs in the linkage.

Therefore, it is desirable to provide an electromagnetic driving device for a mold clamping system to mitigate and/or obviate the aforementioned problems.

SUMMARY OF THE INVENTION

The objective of the present invention is to provide an electromagnetic driving device for a mold clamping system with a simple composition, constant mold clamping force, maintaining mold accuracy, and high motion ability etc. characteristics, which is suitable for mini-size injection molding machine and reduces the manufacture cost.

To achieve the objective, the linkage type mold clamping device of the present invention includes a stationary plate, a mold guiding mechanism, a movable plate and a movable plate driving mechanism. The a movable plate driving mechanism includes: a driving slider, a slider guiding mechanism, a driving slider, a magnetic field generating system, a magnetic force controller, and at lease one linkage. Wherein due to the same direction magnetic field effect or the opposite direction magnetic field effect between two magnetic fields generating devices, the attracting force or the repulsive force will be generated between the driving slider and the opposite magnetic fields generating device, which causes the driving slidr to slide to the opposite magnetic fields generating device, then driving the linkage and the movable plate to open or close a mold, and since the ultimate position of the linkage is a dead-center point, the mold clamping device which generates a self-locking effect to complete mold clamping movement.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
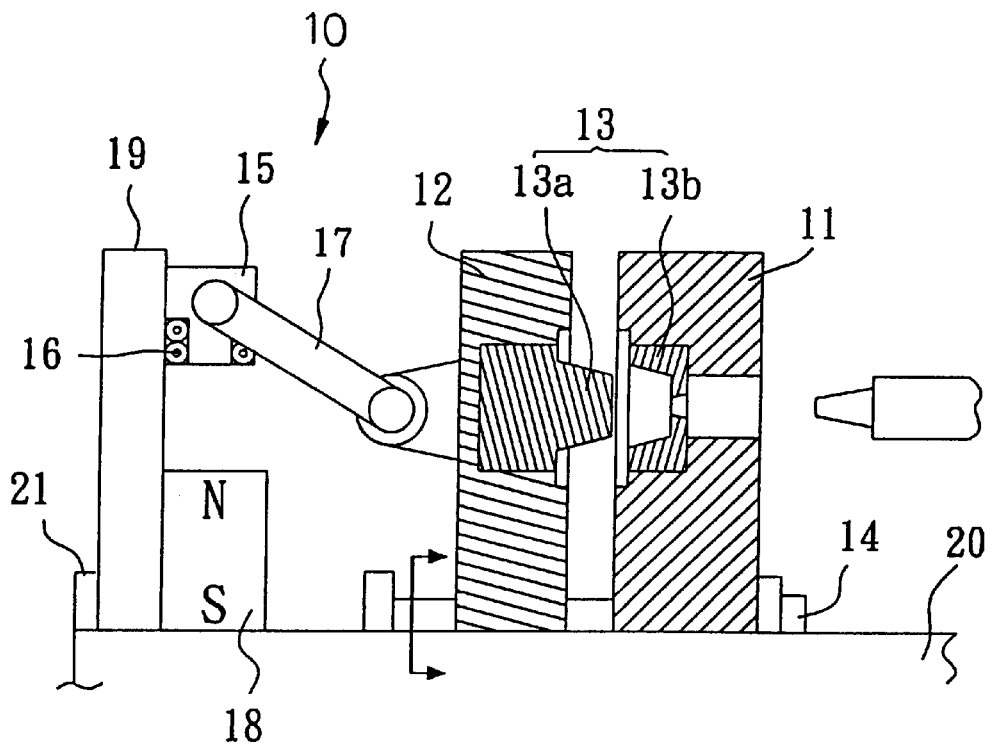
FIG. 1 is a schematic diagram of the electromagnetic driving device of the present invention during opening-mold status.

Please refer to FIG. 1. FIG. 1 is a schematic diagram of the electromagnetic driving device of the present invention during opening-mold status. The electromagnetic driving device of the present invention comprises: a stationary plate 11, a movable plate 12, a mold 13, a mold guiding mechanism 14, and a movable plate driving mechanism 10. The movable plate driving mechanism 10 further comprises: a driving slider 15, a magnetic field generating system 16, 18, a linkage 17, a slider guiding mechanism 19, and a magnetic force controller 21.

As shown in FIG. 1, the stationary plate 11 is fixedly mounted on a lathe bed 20. The mold guiding mechanism 14 is mounted parallel on the lathe bed 20. The movable plate 12 is slidably arranged on the mold guiding mechanism 14, and faces the stationary plate 11. The movable plate 12 generates a relative slide movement to the stationary plate 11 via the mold guiding mechanism 14. The mold 13 comprises: a male mold 3a and a female mold 3b. The slider guiding mechanism 19 is fixedly mounted on the lathe bed 20. The driving slider 15 is arranged on the slider guiding mechanism 19 for sliding on the slider guiding mechanism 19. The magnetic field generating system includes a magnetic field generating device 16 attached on the driving slider 15, and a magnetic base 18 also fixedly mounted on a lathe bed 20. Wherein the magnetic fields generating device 16 is an electromagnetic coil, and the magnetic base 18 is a permanent magnet. The attracting force or the repulsive force will be generated between two magnetic fields generated by the magnetic fields generating device 16 and the magnetic base 18. The magnetic force controller 21 is a current controller, electrically connected to the magnetic field generating device 16. The magnetic force controller 21 is able to provide different, current to control the direction and the magnitude of the magnetic field. One end of the linkage 17 is rotatably mounted on the back side of the movable plate 12 and the other end of the linkage 17 is rotatably mounted on the driving slider 15.

Figure 2:
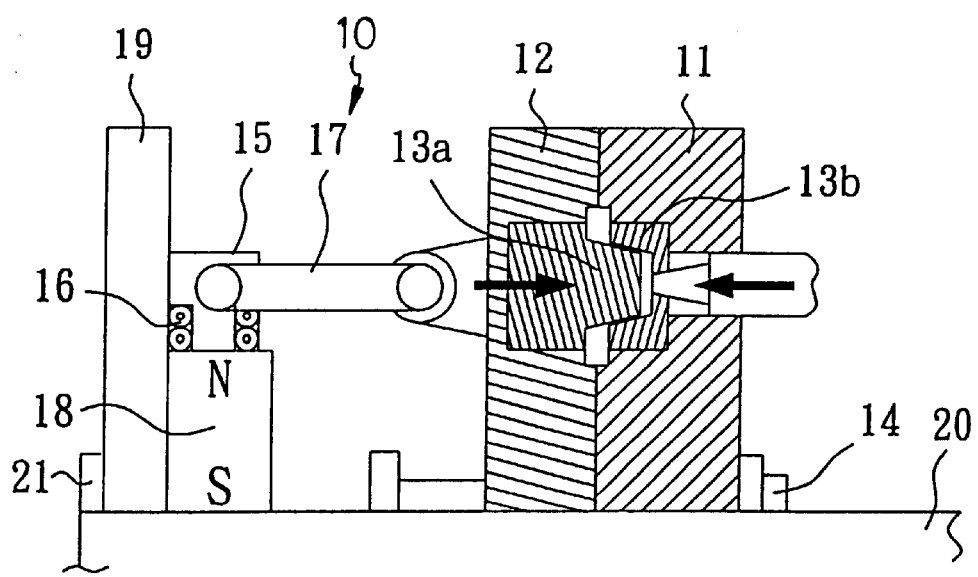
FIG. 2 is a schematic diagram of the electromagnetic driving device of the present invention during closing-mold status.

Please refer to FIG. 2. FIG. 2 is a schematic diagram of the electromagnetic driving device of the present invention during closing-mold status. The magnetic force controller 21 supplies a current to the magnetic field generating system to enable the magnetic field generating device 16 to generate a magnetic field with a magnetic field direction identical with the magnetic field direction of the magnetic base 18. This causes the driving slider 15 to slide to the magnetic base 18, thus driving the linkage 17 to push the movable plate 12 to the stationary plate 11 to perform closing-mold movement and mold-clamping movement.

On the other hand, the magnetic force controller 21 also supplies an opposite current to the magnetic field generating system to enable the magnetic field generating device 16 to generate a magnetic field with a magnetic field direction opposite to the magnetic field direction of the magnetic field generated by the magnetic base 18. This causes the driving slider 15 to pull the movable plate 12 via the linkage 17 to perform opening-mold movement.

Figure 3:
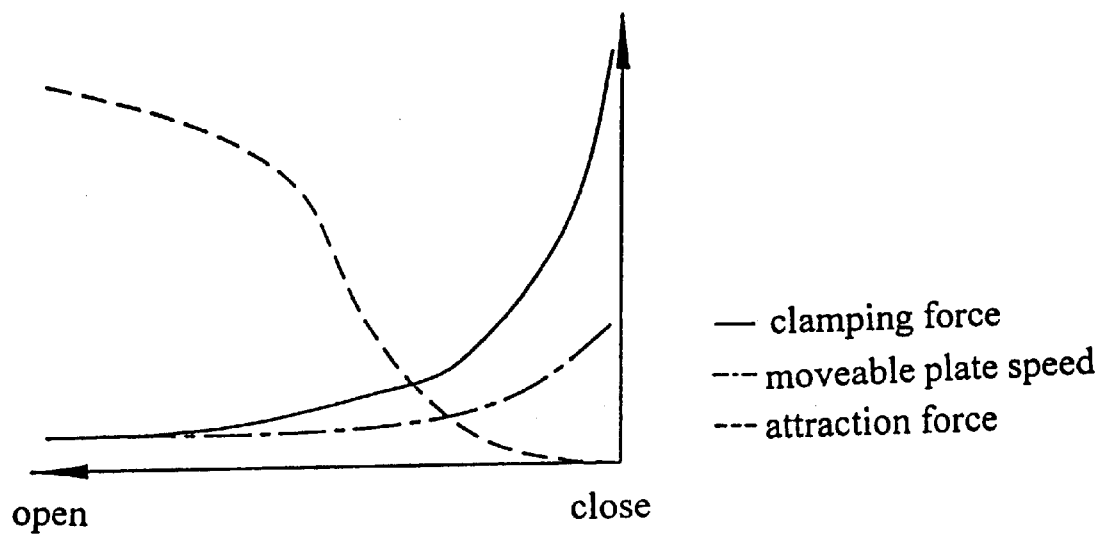
FIG. 3 is a diagram of attracting force and mold-clamping force among the movable plate, the driving slider, and the magnetic base of the electromagnetic driving device of the present invention.

Please refer to FIG. 3. FIG. 3 is a diagram of the mold position from open to close versus the clamping force, the movable plate speed, and the attraction force generating from the electromagnetic device. The attracting and repulsive force are created by the magnetic effect between the magnetic field generating device 16 and the magnetic base 18. The attracting and repulsive force drive the driving slider 15 then the linkage 17 then the movable plate 12 to perform open and close mold movement. The combination of the driving slider 15, the linkage 17, the movable plate 12, and the guiding mechanism 14 may be equivalent to a four-bar linkage mechanism. When the mechanism closes to "dead-center" position, the linkage 17 is in horizontal position, and the speed ratio of the movable plate 12 to the driving slider 15 will approach zero rapidly. At this moment, the force ratio of the movable plate 12 to the driving slider 15 will be magnified to infinite theoretically if there's no friction influence in the mechanism. Therefore, the speed will be reduced before clamping the mold and also reduce the speed of the movable plate 12 sharply to avoid mold damages due to the impact force. However, increases in the force ratio may cause the mold clamping force to be much greater than the magnetic force between the driving slider 15 and the magnetic base 18 to achieve a force magnification effect. In addition, the clamping mold position at the dead-center point of the mechanism will create "self-lock" effect to avoid mold open due to the high injection pressure.

Figure 4:
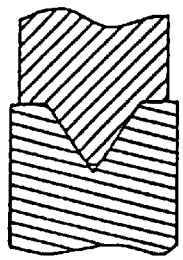
FIG. 4 is a schematic diagram of the sliding way of the mold guiding mechanism or the guiding slider mechanism is a V-type sliding way.
Figure 5:
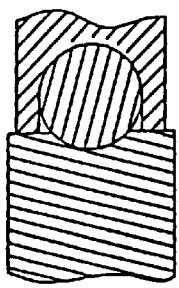
FIG. 5 is a schematic diagram of the sliding way of the mold guiding mechanism or the guiding slider mechanism is a columnar sliding way.

Please refer to FIG. 4 and FIG. 5. FIG. 4 is a schematic diagram of a V-type sliding way of the mold guiding mechanism 14 and a guiding slider mechanism 1a. FIG. 5 is a schematic diagram of a Columnar sliding way of the mold guiding mechanism 14 and the guiding slider mechanism 1a. As shown in FIG. 4 and FIG. 5, the sliding way of the mold guiding mechanism 14 and the guiding slider mechanism 1a may be a V-type sliding way, a columnar sliding way, or any sliding way with one degree of freedom. Furthermore, in order to increase the mold-clamping force of the mold clamping device and the interactive force between the driving slider 15 and the magnetic base 18, the device of the present invention has some alternative methods: 1. The number of the magnetic fields generating systems can be a plurality. 2. The linkage can be a linkage set with a plurality of linkages. 3. The current controller may be used to control current magnitude and direction.

Figure 6A:
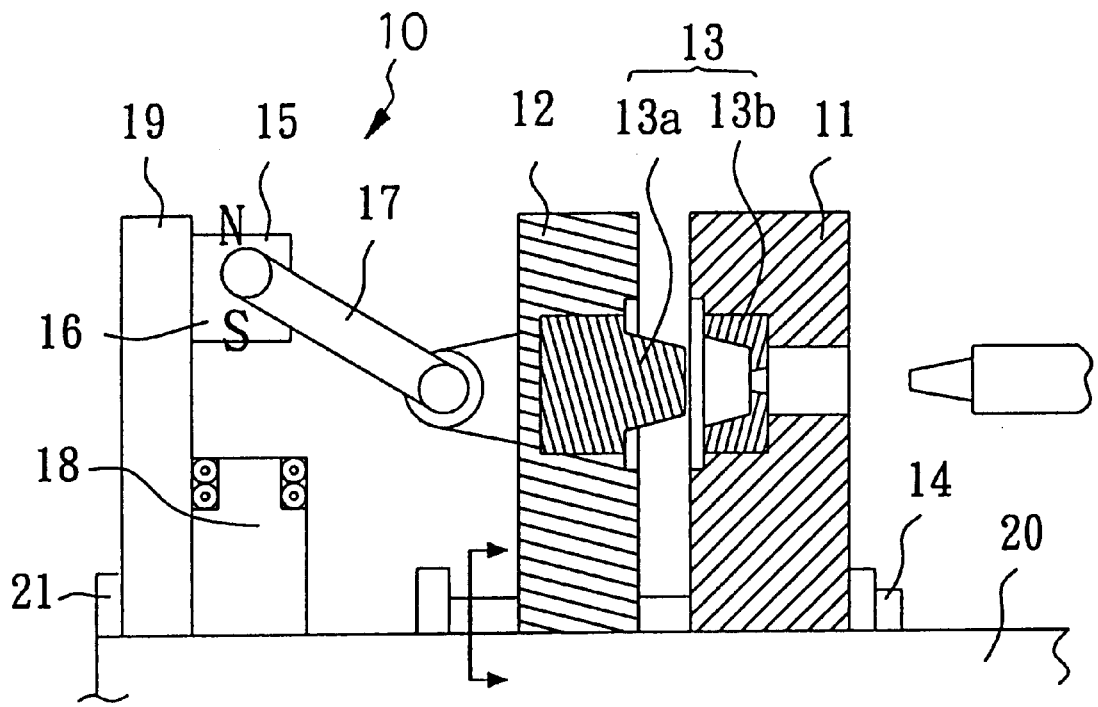
FIGS. 6(a), (b) is a schematic diagram of the other two alternative embodiments of the magnetic field generating system of the present invention.
Figure 6B:
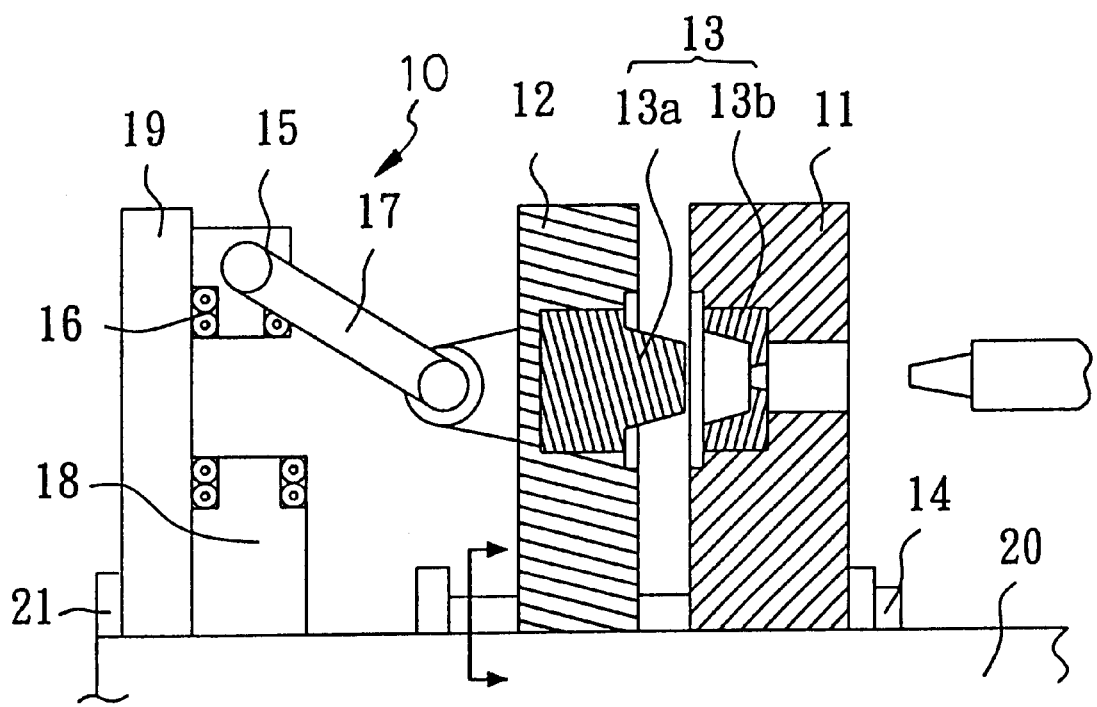

Please refer to FIG. 6. FIGS. 6(*a*), (*b*) is a schematic diagram of the other two alternative embodiments of the magnetic field generating system of the present invention. As shown in FIG. 6(*a*), in one of the alternative embodiments of the present invention, the magnetic field generating device 16 is a permanent magnet, and the magnetic base 18 is an electrical coil. Furthermore, as shown in FIG. 6(*b*), in another one the alternative embodiments of the present invention, both the magnetic fields generating device 16 and the magnetic base 18 are electrical coils, which are controlled by the current controller.

The present invention provides compact construction and a control method to cause the driving slider 15 to drive the linkage 17 to move the movable plate 12 to perform open-mold movement and close-mold movement via the magnetic force. Since the linkage 17 drives the movable plate 12, the locking-process of the movable plate 12 will be started quickly and the speed of the movement of the movable plate 12 will be reduced before reaching the mold-clamping position to provide a strong mold-clamping force. In the meanwhile, as a result of a dead point effect of the linkage, the mold clamping system is in a self-locking status and the mold-clamping force is transmitted and provided in an internal force manner. Thus, the mold will not be opened easily, and the driving slider 15 and the magnetic base 18 only need to generate small amounts of attracting force to maintain mold-locking status.

The electromagnetic driving device of the present invention is suitable for a mini-size injection molding machine. The device utilizes a magnetic force to drive the linkage, movable plate etc. to perform open-mold movement, close-mold movement, and mold-clamping without a hydraulic cylinder, servomotor, ball screw, and tie bars etc. Besides, the electromagnetic driving device of the present invention has the advantages of low mold clamping speed, mold clamping force amplification, self-locking effect of the linkage, and equal mold locking force concentrated at the center of mold. Moreover, the present invention provides compact construction, easy control and easy operation and also keeps the advantages of the conventional mold clamping device and clean working environment. In addition, one part of the magnetic field generating system is mounted in the driving slider, so the heat effect of the magnetic field will not be transmitted to the mold to affect the product accuracy.

Although the present invention has been explained in relation to its preferred embodiment, it is to be understood that many other possible modifications and variations can be made without departing from the spirit and scope of the invention as hereinafter claimed.

What is claimed is:

1. A linkage type mold clamping device, comprising:
   a stationary plate on which a stationary side mold is mountable;
   a movable plate on which a movable side mold is mountable in a position opposite the stationary side mold;
   a mold guiding mechanism by which said movable plate can slide;
   a lathe; and
   a movable plate driving mechanism for driving the movable plate, using electromagnetic force, on said mold guiding mechanism, said movable plate driving mechanism comprising:
      a slider guiding mechanism fixedly mounted on said lathe;
      a driving slider slidably arranged on the slider guiding mechanism for sliding on the slider guiding mechanism;
      a magnetic field generating system comprising a magnetic field generating device and a magnetic base, for generating first and second magnetic fields, the magnetic field generating device being attached on the driving slider and the magnetic base being attached on the lathe;
      a magnetic force controller electrically connected to the magnetic field generating system, for controlling a direction and a magnitude of the magnetic fields; and
      at least one linkage, one end of the linkage being rotatably mounted on a back side of the movable plate and another end of the linkage being rotatably mounted on the driving slider;
   wherein the first magnetic field causes an attracting force to be generated between the magnetic field generating device and the magnetic base, and the second magnetic field causes a repulsive force to be generated between the magnetic field generating device and the magnetic base, thereby causing the driving slider to slide and drive the linkage to move the movable plate toward and away from the stationary plate, with a limit position of the linkage being in a dead center position of said movable plate driving mechanism, so that the mold clamping device generates a self-clamping effect to complete a mold-locking movement.

2. The device as claimed in claim 1, wherein the magnetic field generating device is an electrical coil, and the magnetic base is a permanent magnet.

3. The device as claimed in claim 1, wherein the magnetic field generating device is a permanent magnet, and the magnetic base is an electrical coil.

4. The device as claimed in claim 1, wherein the magnetic field generating device and the magnetic base are both electrical coils.

5. The device as claimed in claim 1, wherein the mold guiding mechanism or the slider guiding mechanism is a V-type sliding mechanism.

6. The device as claimed in claim 1, wherein the mold guiding mechanism or the slider guiding slider mechanism is a columnar sliding mechanism.

7. The device as claimed in claim 1, wherein the magnetic force controller is a current controller adapted to provide an adjustable current with different direction and/or different magnitude.

* * * * *